Jan. 2, 1968  P. L. SPENCER  3,361,892
ELECTRIC ARC WELDING

Filed July 29, 1965  3 Sheets-Sheet 1

TORCH  WORK
(POWER CABLES)

AUX CONNECTIONS
TO TORCH & WIRE FEED
UNIT

Inventor
Philip L. Spencer
By Stevens, Davis, Miller & Mosher
Attorneys

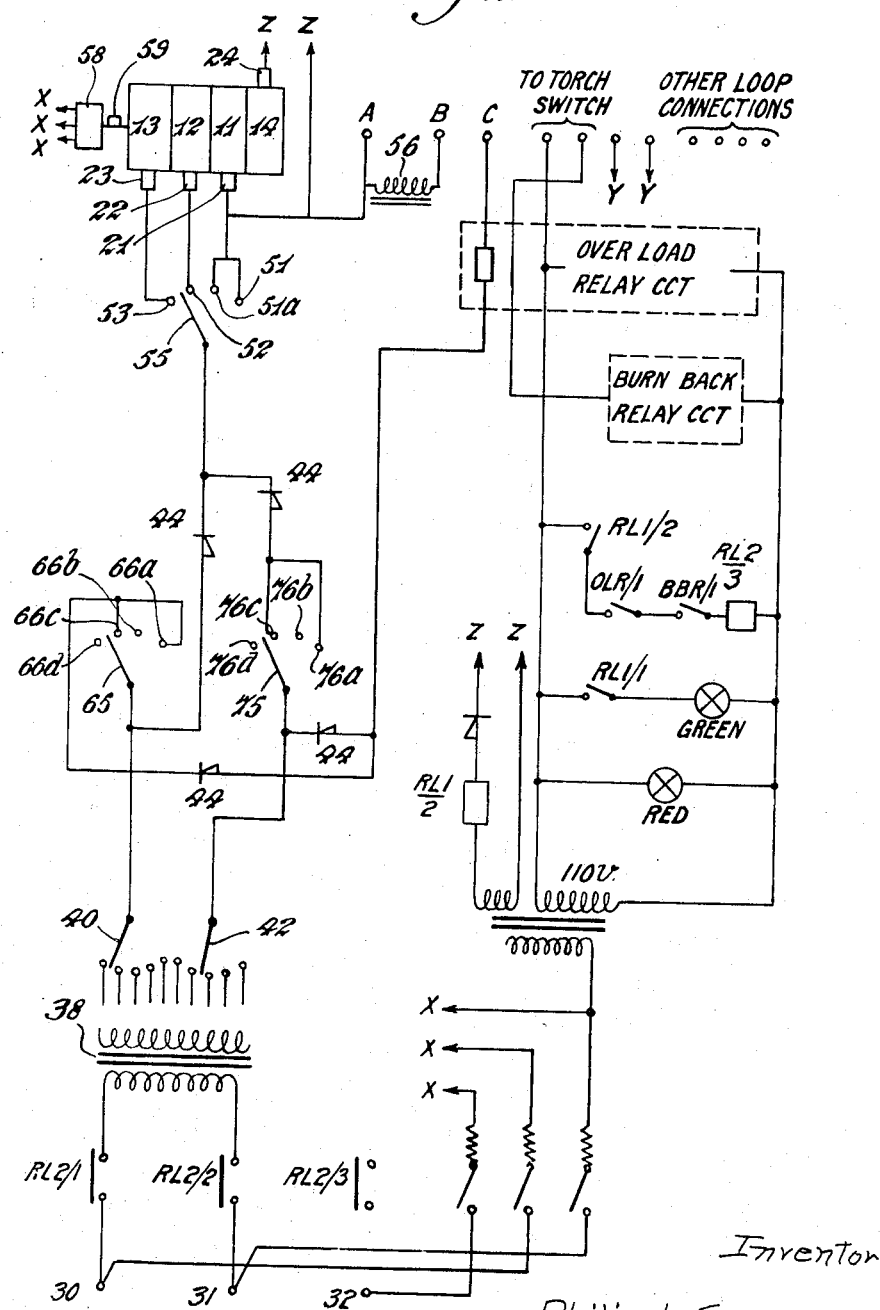

Jan. 2, 1968   P. L. SPENCER   3,361,892
ELECTRIC ARC WELDING
Filed July 29, 1965   3 Sheets-Sheet 3
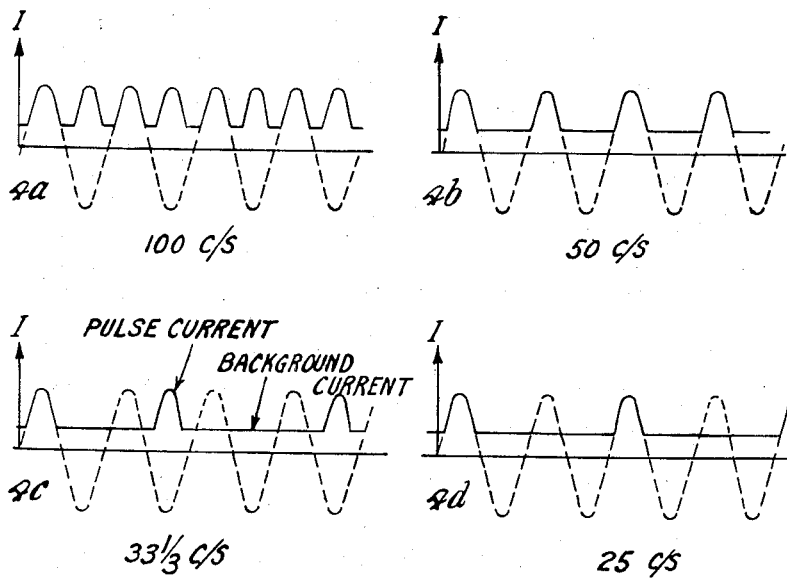
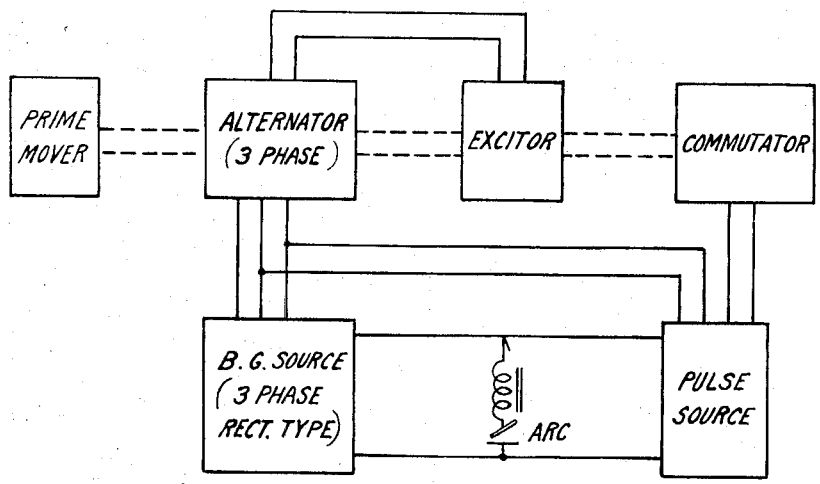

United States Patent Office 3,361,892
Patented Jan. 2, 1968

3,361,892
ELECTRIC ARC WELDING
Philip L. Spencer, Berkhamsted, England, assignor to The British Oxygen Company Limited, London, England
Filed July 29, 1965, Ser. No. 475,701
Claims priority, application Great Britain, Aug. 6, 1964, 32,022/64
7 Claims. (Cl. 219—131)

ABSTRACT OF THE DISCLOSURE

D.C. electric arc welding apparatus for "pulsed arc" welding has a primary source to keep the arc alive and a secondary source which supplies welding current pulses. The desired frequency of pulses supplied to the welding electrode is obtained by selecting the appropriate track of a commutator having several tracks which differ among themselves in the number of operative conducting areas. The commutator may be driven by a motor synchronous with the frequency of an A.C. supply to the apparatus.

---

The present invention relates to consumable-electrode electric arc welding, which may be gas shielded, and particularly to power supplies therefor.

Recent work in this field has shown that great operational advantages can be achieved by modulating the welding current such that current pulses of controlled amplitude, duration, and frequency alternate with periods of relatively low (or background) current of the same polarity as the pulses. The combined effect of these two currents is to ensure that metal is transferred from the electrode in a much more controllable manner than previously obtainable. This welding current can be supplied from two power sources, e.g. a primary (or background) D.C. power supply of suitable output characteristics, and a secondary pulsed power supply. Examples of such advantages are: (i) the ability to work at lower mean welding currents than have been hitherto possible with free flight transfer, thereby keeping the weld pool at a temperature which is sufficiently low to facilitate working in positions other than the horizontal and yet ensure good fusion; (ii) the size of the metal droplet transferred can now be controlled; and (iii) the possibility of using lower average welding currents for a given wire size reduces the need to utilise very thin and costly electrode wires, thus reducing the problem of surface contamination which is particularly acute with fine wires of high surface: volume ratio.

It is an aim of the present invention to provide apparatus whereby a plurality of pulse frequencies are made available without undue complications of circuit or apparatus.

In accordance with one aspect of the present invention, we provide an electric arc welding power supply system comprising a primary power supply adapted to provide a voltage and current sufficient to maintain an arc between electrode and workpiece and a secondary power supply adapted to provide pulses of welding current, the combined effect of these two currents being sufficient to effect control of metal transfer from the electrode to the workpiece, the secondary power supply including a DC source arranged to feed a commutator having a plurality of tracks differing inter se in number of operative conducting areas, the tracks being adapted for engagement by a brush or brushes, means for rotating the commutator at a sub-multiple of synchronous speed, and means being provided whereby the pulse frequency of the commutator output can be chosen by selection of the appropriate track.

In accordance with another aspect of the invention, I provide a commutator comprising a rotatable body having a plurality of tracks which can be engaged by a brush or corresponding brushes, the tracks being formed of alternate operative conducting areas and non-operative areas (which may be conductive or non-conductive as may be convenient for design of the commutator), and the tracks differing inter se in number of operative conducting areas.

The expression "operative conducting area" is intended to indicate a conducting area of a commutator track which is electrically connected to both an input and output terminal of the commutator. In operation, the operative conducting areas of the commutator tracks form part of the current path through the commutator, whereas the non-operative areas, although they may be of conducting material, are insulated electrically from the remainder of the commutator, and thus do not form a part of such conductive path.

The invention will now be particularly described in the following description of an illustrative embodiment, given by way of example only with reference to the accompanying drawings in which:

FIG. 2 is a circuit diagram of a secondary power supply system for supplying pulses;

Figure 3:
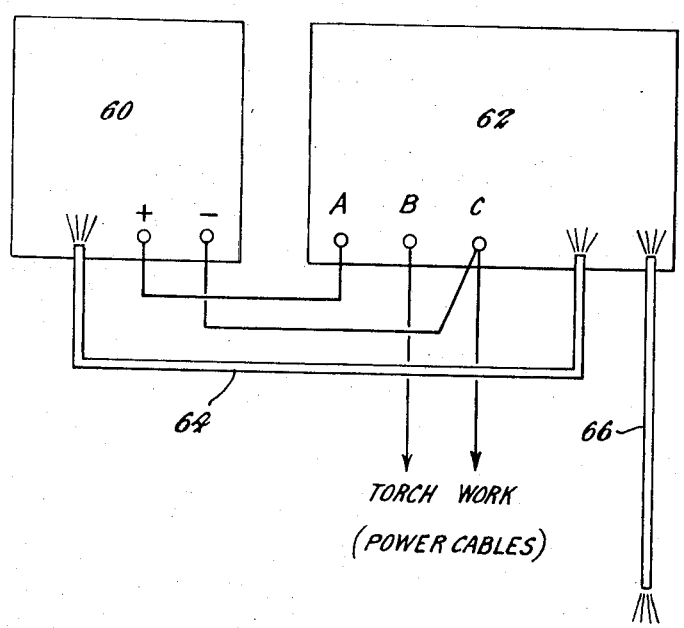

FIG. 3 is a circuit diagram showing the connections between the primary power supply system, the secondary power supply system, the welding torch, and the workpiece; and FIG. 4 which includes 4a–d shows four examples of pulsed waveforms obtainable with the apparatus described herein; and FIG. 5 shows a diagrammatic sketch of an arrangement in which the commutator is mounted on the shaft of an alternator which supplies the current which is rectified and used for welding.

Figure 1:
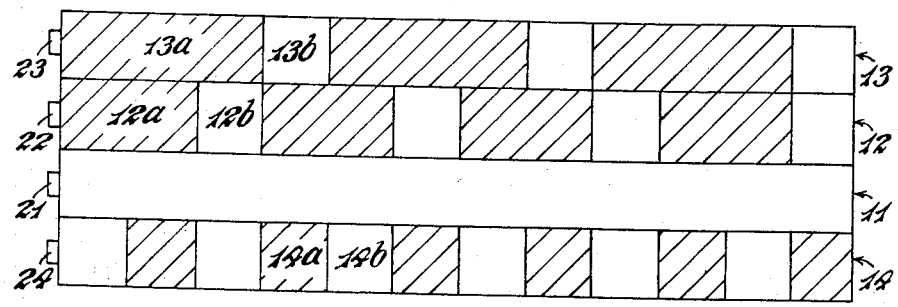
FIG. 1 is a developed view of a curved surface of one example of a commutator according to the invention, showing the arrangement of operative conducting areas.

Referring firstly to FIG. 1 the curved surface area of a commutator which in this example is of cylindrical shape is seen in developed view as a rectangle generally indicated at 10, and this surface has four peripheral tracks 11, 12, 13 and 14. Each track has a corresponding brush, referenced 21 to 24 respectively. The tracks differ inter se in the number of operative conducting and non-operative areas (or segments) for a purpose which will appear hereinafter, and in the example shown, track 11 is wholly conductive for the whole 360° of the surface, track 12 has alternate insulating and conducting areas denoted 12a and 12b respectively, each of the conducting areas subtending an angle of 30° and each of the non-conducting areas subtending 60° at the axis of rotation of the commutator, track 13 has 90° insulating areas 13a alternating with 30° conducting areas 13b, and track 14 has 30° insulating areas 14a alternating with 30° conducting areas 14b and serves as a synchronisation track. All the conducting areas, i.e. track 11 and areas 12b, 13b and 14b are connected to each other. The commutator is arranged to be driven at one sixth of synchronous speed by a synchronous motor.

Referring now to FIG. 2, the secondary or pulsed power supply system is supplied with sinusoidal input waveform, for example a single phase of 380/440 volt 3-phase 50 c./s. A.C. mains, using a transformer, a rectifier circuit, and the commutator described above as a synchronous switching device arranged to effect switching at current zeros in the circuit. The mains supply terminals are shown at 30, 31 and 32 and a main welding contactor at 34, the latter having contacts RL2/1, RL2/2 and RL2/3. The A.C. supply feeds a transformer primary winding 36, and the transformer secondary winding 38 is provided with a number of studs swept by switch wiper arms 40, 42. These serve to permit selection of the desired welding voltage. Four rectifiers 44, arranged as shown to form a single phase bridge rectifier split into two sections, receive the output from the wipers 40, 42 and apply it between the commutator 10 and terminal C. Each of the commutator brushes 21–23 is connected to a corresponding stud 51–53 with brush 21 being connected to both studs 51 and 51a, and these studs are swept by a wiper arm 55, this wiper arm being ganged to wiper arms 65 and 75 arranged to sweep corresponding sets of studs 66a–d and 76a–d respectively. Of these sets, only the first stud 66a or 76a (corresponding to stud 51) is in circuit, and when the wiper arms 65 and 75 are on the first stud, all four rectifiers 44 are operative constituting a full-wave bridge rectifier circuit interposed between the transformer 38 and the commutator. When the switch arms 55, 65 and 75 respectively are on studs 51a, 66b and 76b respectively, only two of the rectifiers 44 are operative and half-wave rectification only is thus achieved. Thus as will be seen hereinafter, the output from brush 21 is either 50 pulses/sec. or 100 pulses/sec. (assuming 50 c.p.s. A.C. mains) according to the position of ganged wiper arms 55, 65 and 75.

It will be appreciated that instead of studs 51, 51a, 52 and 53 connected to brushes 21–23 permanently engaging the commutator tracks, a precisely equivalent result can be obtained by utilising sliding brush gear of any known type. Position of the wiper arm 55 thus controls the selection of which of the brushes 21–23 and corresponding tracks 11–13 is in circuit, and the wiper arm 55 and associated studs constitute means for selecting one of the commutator tracks.

The output from brush 21 is fed direct to terminal A, and via a choke 56 to terminal B. It will be seen that when wiper arm 55 is in contact with stud 51, the commutator 10 is effectively short-circuited, and the pulse frequency across terminals A and C is the same as that of the half- or full-wave rectified A.C. supply, i.e. 50 or 100 cycles per second in the case of a 50 cycle supply.

The connection of the secondary power supply system to the welding torch, workpiece, and primary (or background) power supply system is shown in FIG. 3. It will be seen that the output from the primary or background power supply is fed to the welding torch and the workpiece via the choke 56, and the provision of such a choke forms the subject matter of our co-pending patent application Ser. No. 475,698. Referring to FIG. 3, the primary power supply system is shown as a unit 60, and the secondary power supply system as a unit 62. The units are joined by a multi-core cable 64 which carries auxiliary connections between the two power supplies, and also carries the wires (YY in FIG. 2) of a circuit which ensures what when contactor 34 is open, a corresponding contractor in the primary power supply unit 60 is also open. Another multi-core cable 66 carries further auxiliary connections between the pulsed power supply 62 and the welding torch and electrode wire feed unit.

The commutator 10, FIG. 2, is driven by a synchronous motor 58 and the motor shaft or the commutator body carries a centrifugal switch 59 which is included in a circuit which ensures that the welding contactor 34 is open unless the switch 59 indicates that the commutator 10 is rotating at its prescribed speed namely, a sub-multiple of synchronous speed. By way of example, the motor 58 may be a 500 r.p.m. motor, and the prescribed speed will then be 500 r.p.m. A three phase ¼ H.P. salient pole synchronous motor has been found to be suitable.

The brushes 21 and 24 are provided for engagement with tracks 11 and 14 respectively, and these brushes are connected in a synchronisation relay circuit. The purpose of this circuit is to indicate if the commutator motor 58 has locked in 180° (electrical) out of phase when it is switched on and to prevent the welding contactor being closed if this has in fact happened. The leads to the synchronising brushes are shown at Z on FIG. 2 and the synchronising relay is referenced RL1/2. It the example of the invention described herein, synchronisation is only necessary when half-wave rectified pulses are supplied to the commutator, since a three phase salient synchronous motor can lock into synchronism either 0° or 180° electrical with respect to the supply. In opertaion if the lamp "GREEN" (FIG. 2) does not light upon closure of circuit breaker 70, then the operator switches off (i.e. opens 70) and tries again.

An overload relay circuit is included, in accordance with conventional practice, to cut off the power supply system if a current overload occurs, for example if the background power supply were connected to the primary power supply with reverse polarity. The overload relay contacts OLR/1 are placed in series with the energising coil of main welding contactor RL2 and it can be seen that if contacts OLR/1 open, the contactor is de-energised and opens its contacts RL2/1, RL2/2 and RL2/3, thereby cutting off the power. A burn-back relay is also provided, in accordance with conventiontal practice, and its contacts BBR/1 are similarly located and delay the opening of the contacts on RL2 and the equivalent contacts in power source 60 such that the electrode wire is prevented from freezing into the weld pool at the end of a weld.

The operation of the arrangement will now be described. The contactors 34 and 70 are closed, and motor 58 thereby started. Assuming it is in synchronism and that wiper 55 is on stud 51, with one phase of the 3-phase 50 cycle A.C. supply connected to terminals 30, 31 as shown in FIG. 2 all the full-wave rectified 50 cycle pulses will be passed to the torch and workpiece, providing 100 pulses per second. With the wiper arms 55, 65, 75 on the second stud (51a, 66b, 76b) then half-wave rectified pulses will be passed to the torch and workpiece, providing 50 pulses per second. With wiper arms 55, 65, 75 on studs 52, 66c, and 76c, 100 pulses per second arrive at the commutator, but only one in three of these are passed by the commutator because alternate pulses arrive when a non-operative (i.e. insulating or non-connected conductive) area of the commutator track 12 is in contact with brush 22. Similarly, with wiper arms 55, 65, 75 on studs 53, 66d, and 76d, only every fourth pulse arriving at the commutator is passed by it, giving a commutator output pulse frequency of 25 per second.

The pulse waveforms can be seen in FIG. 4 of which FIG. 4a represents the output with switch wiper arms 55, 65, 75 on studs 51, 66a, 76a, FIG. 4b represents that with wiper arms 55, 65, 75 on studs 51a, 66b, 76b, FIG 4c that with the wiper arms on studs 52, 66c and 76c, i.e. with brush 22 and the track 12 in circuit, and FIG. 4d that with the wiper arms on studs 53, 66d, and 76d, i.e. with brush 23 and track 13 in circuit.

It will be appreciated that modifications can be made within the scope of the invention. For example, the motor 58 could be driven at any desired sub-multiple of synchronous speed, and any convenient number and spacing of non-operative insulating areas could be provided on the commutator tracks. A commutator with any desired number of tracks could be employed, thus giving a wide range of choice of pulse frequencies.

Although in the previous description a commutator having a cylindrical body with peripheral tracks has been envisaged, it will be appreciated that other forms of commutator may be employed without departing from the principles and scope of the present invention. For example, a commutator in the form of a flat disc carrying concentric tracks engaged by brushes at different radial distances from the rotation axis of the disc has been found suitable. The tracks may be located on the same or opposite sides of the disc and may be convenient.

In another alternative form of the invention, when the primary source of power for the welding process is an alternator as is frequently the case with on-site welding, it is possible to dispense with the synchronising motor driving the commutator by mounting the commutator on the alternator shaft. A diagrammatic sketch of such an arrangement is appended as FIG. 5.

The invention is applicable to consumable electrode welding using solid wire electrodes and also composite electrode wires having a coating or a core of flux material.

I claim:

1. D.C. arc welding apparatus comprising a primary source of direct current sufficient to maintain an arc between an electrode and a workpiece, and a secondary source of pulses of welding current, the combined effect of these two sources being to control the transfer of weld metal from the electrode to the workpiece, the primary source being adapted to be fed with alternating current, said secondary source including a commutator having operative conducting areas arranged in a plurality of tracks having differing numbers of operative conducting areas, at least one brush engaging the tracks, means for rotating the commutator at a desired speed, and selector means for choosing the frequency of the pulses to be supplied to the welding electrode by selection of the appropriate track.

2. The apparatus of claim 1 wherein the said secondary source further comprises full-wave rectifying means associated with said selector means for feeding the said commutator with single phase full-wave rectified A.C.

3. The apparatus of claim 1 further comprising an electric motor synchronously rotatable relative to the alternating current and for rotating the commutator at a sub-multiple of synchonous speed, and a three-phase supply feeding the motor with one of the phases energizing the said secondary source of pulses.

4. The apparatus of claim 3 further comprising circuit means ensuring cut-off of the power input to the system except when the commutator is rotating at the desired submultiple of synchronous speed.

5. The apparatus of claim 1 wherein the said means for rotating the commutator at a desired speed comprises an electric motor rotatable synchronously in relation to the alternating current, and further comprising a synchronizing relay having its coil located in circuit such that an energizing current flows therethrough to close its contacts when the synchronous motor is rotating correctly and synchronously in phase but to open its contacts when it is rotating synchronously 180° out of phase, the contacts of the synchronizing relay being arranged in a circuit to prevent power being fed to the secondary source of pulses except when the synchronizing relay contacts are closed.

6. The apparatus of claim 1 wherein the said secondary source further comprises half-wave rectifying means associated with said selector means for feeding said commutator with single phase half-wave rectified A.C.

7. D.C. electric arc welding apparatus comprising a primary source of direct current sufficient to maintain an arc between an electrode and a workpiece, a secondary source of pulses of welding current in parallel with said primary source, an alternator energizing said sources, the primary source being adapted to provide a unidirectional voltage and current, and the combined effect of these two sources being to control transfer of weld metal from the electrode to the workpiece, a commutator mounted on the alternator shaft for rotation therewith and having a plurality of tracks differing inter se in the number of operative conducting areas, the secondary source being connected to said commutator, at least one brush engaging the tracks, drive means for rotating the commutator at a desired speed, and selector means for choosing the frequency of pulses to be supplied to the welding electrode by selection of the appropriate track.

References Cited

UNITED STATES PATENTS

| | | | |
|---|---|---|---|
| 2,777,973 | 1/1957 | Steele et al. | 315—171 |
| 3,051,829 | 8/1962 | Manz | 219—131 |

RICHARD M. WOOD, *Primary Examiner.*